Nov. 3, 1942.    O. SCHLAEPFER    2,300,977
TWO-SHAFT INTERNAL COMBUSTION ENGINE
Filed Oct. 20, 1939    4 Sheets-Sheet 4
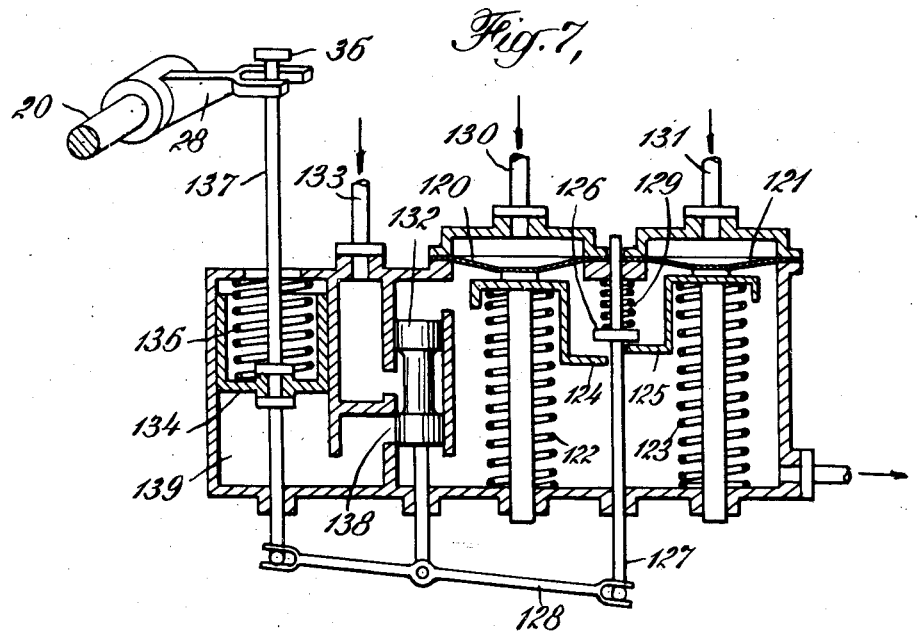
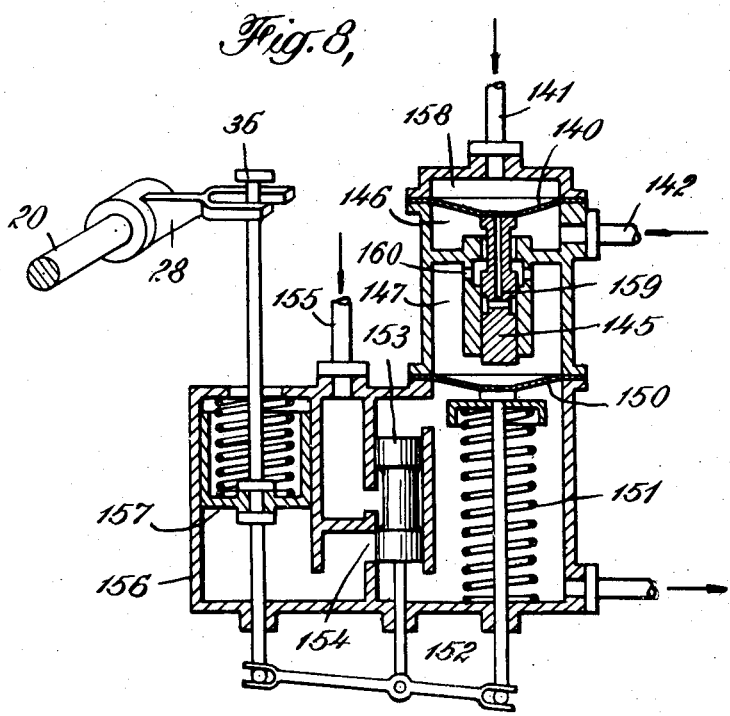
INVENTOR
Oscar Schlaepfer
BY
Pennie, Davis, Marvin & Edmonds
ATTORNEYS Patented Nov. 3, 1942

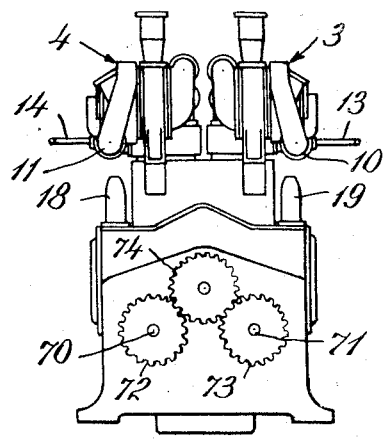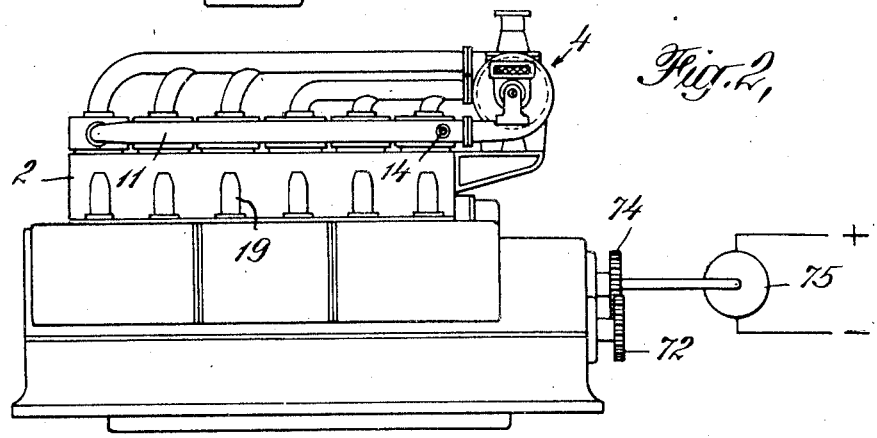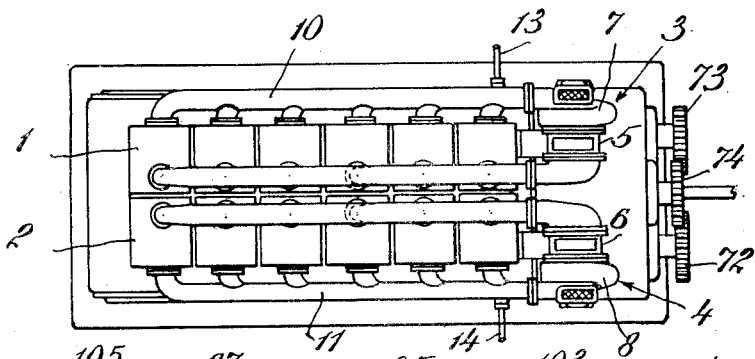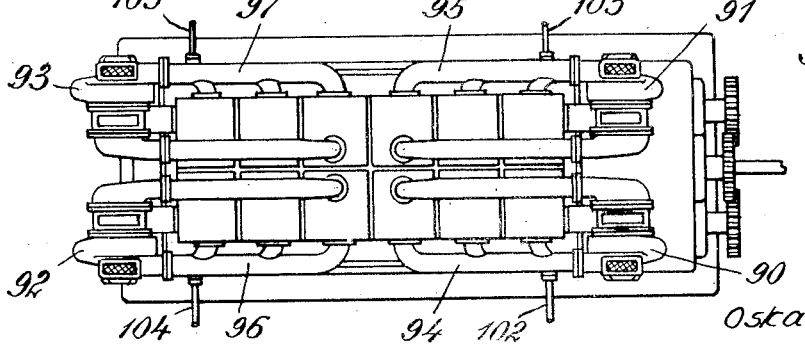

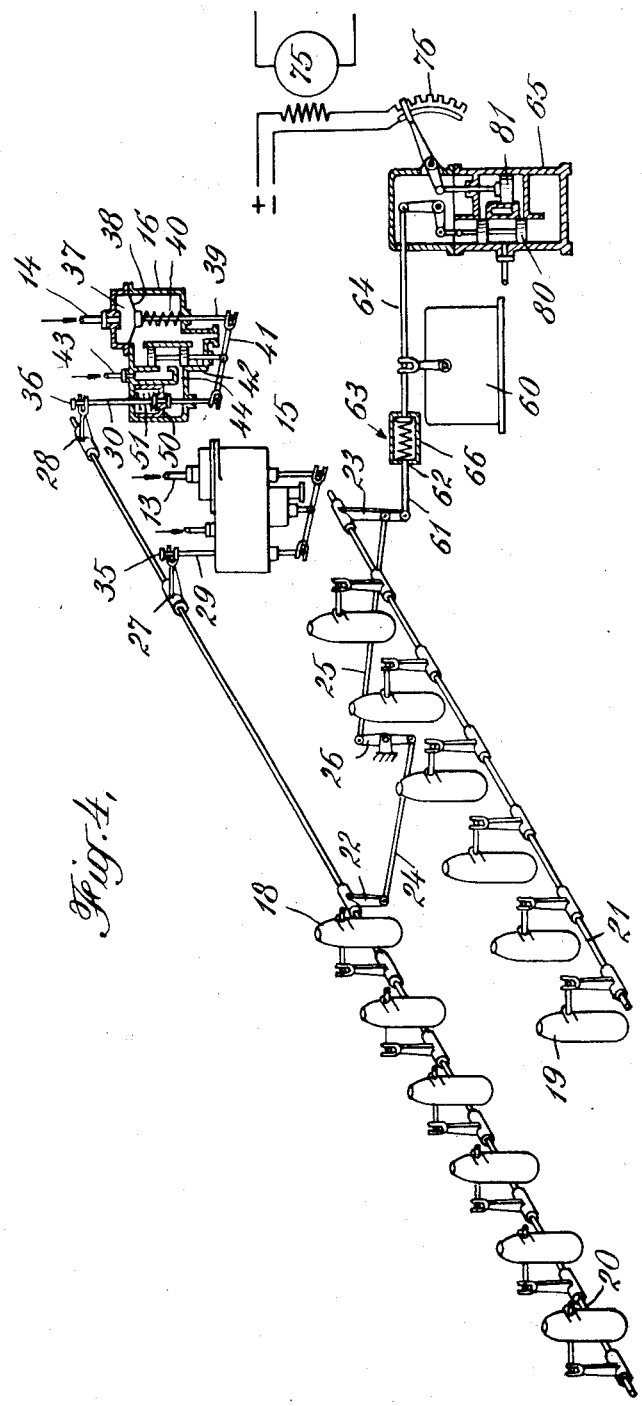

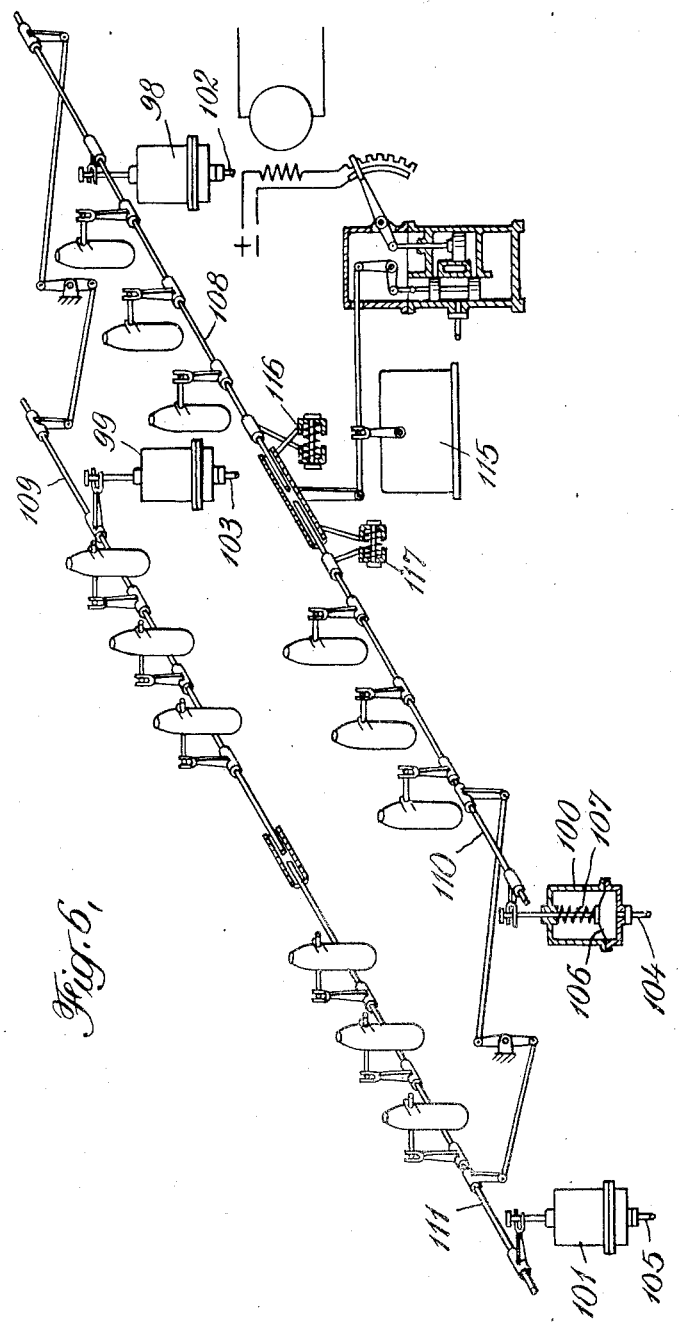

2,300,977

UNITED STATES PATENT OFFICE 2,300,977

TWO-SHAFT INTERNAL COMBUSTION ENGINE

Oskar Schlaepfer, Winterthur, Switzerland, assignor to Sulzer Frères, Société Anonyme, Winterthur, Switzerland Application October 20, 1939, Serial No. 300,341
In Switzerland June 7, 1939

4 Claims. (Cl. 123—140)

This invention relates to a two-shaft internal combustion engine in which each shaft is driven by a separate row of cylinders supplied with supercharging air by at least one separate supercharging unit. In the engine of the invention, each row of cylinders is provided with as many fuelpump regulating-rods, as there are supercharging groups per row, and the rod of the cylinders belonging to one supercharging group are operatively connected to the rod of the opposite cylinder group of the other row, so that the movement of one rod effects corresponding movement in the other rod. The rods are connected to a speed governor and each rod is connected to one or more limiting devices which are actuated by the pressure of the supercharging air in the supercharging units. The limiting devices are constructed and arranged to cause the regulating rods to decrease the admission of fuel by all of the fuel pumps operated by the corresponding operatively connected rods when the supercharging pressure of either unit falls below a predetermined value. The decrease in fuel admission to the cylinder groups of both rows the regulating rods of which are operatively connected is, accordingly, determined by the decrease in supercharging pressure in one or both of the supercharging units and the admission of fuel to the cylinders of both rows corresponds to the lowest supercharging air pressure of the two units.

It is an object of the invention to interconnect the regulating rods to the speed governor by means of a resilient coupling which permits the limiting devices to decrease the fuel supply when the supercharging pressure is low irrespective of the action of the speed governor, and to permit the governor, at other times, to increase or decrease the fuel supply.

The engine arrangement of the invention includes means under the control of the speed governor for regulating the load on the engine, and particularly for decreasing the load thereby increasing the engine speed when the speed of the engine previously falls as a result, for example, of the decrease in the supply of fuel. A further object of the invention is the provision of independent supercharging units for two-row engines in which the two rows are always equally loaded.

In the accompanying drawings:

Fig. 1 is a front end view of a two-row engine having each row of cylinders supplied with air from a single separate supercharging unit;

Fig. 2 is a side view of the engine of Fig. 1;

Fig. 3 is a top view of the engine of Fig. 1;

Fig. 4 is a diagrammatic illustration of an arrangement of control apparatus for an engine of the type shown in Figs. 1 to 3 embodying the invention;

Fig. 5 is a top view of a two-row twelve-cylinder engine in which half the cylinders of each row is supplied with supercharging air from a separate supercharging unit;

Fig. 6 is a diagrammatic illustration of control apparatus embodying the invention for use in connection with an engine of the type shown in Fig. 5;

Fig. 7 is an enlarged cross-sectional side view of a limiting device embodying the invention; and Fig. 8 is an enlarged cross-sectional side view of a different form of limiting device embodying the invention.

The engine shown in Figs. 1 to 3 is a twelve-cylinder two-row Diesel engine, each cylinder row 1 and 2 being connected to and supplied with air by a separate supercharging unit 3 and 4 comprising turbines 5 and 6 driving compressors 7 and 8 which force the supercharging air into the engine cylinders through the air manifolds 10 and 11. The exhaust gases from the cylinders which operate the turbines are finally discharged to the atmosphere in the usual way. The air manifolds are connected to pipes 13 and 14 which are connected to the limiting devices 15 and 16 respectively (Fig. 4).

The limiting devices 15 and 16 are similarly constructed. The device 16 is illustrated in detail and it is understood that the description of its operation applies to the device 15. The fuel pumps 18 and 19 of each row of cylinders are operated by the separate fuel-pump regulating-rods 20 and 21. These rods are fixed to the levers 22 and 23 which are interconnected by means of the rods 24 and 25 and the double-acting lever 26. The extended end portion of the rod 20 has bifurcated members 27 and 28 attached thereto, to which rods 29 and 30 of the regulating devices 15 and 16 respectively effect sliding contact. The upper end of each of the rods 29 and 30 has a stop member 35 and 36 to limit the sliding motion of the bifurcated members. Each of the limiting devices has a chamber 37 to which one of the pipes 13 and 14 is connected. Pressure of the gas within the chambers acts upon a diaphragm 38 which forces the rod 39 downwardly against the action of the spring 40. This action carries the lever 41 downwardly and with it the valve 42. Any suitable fluid under pressure is admitted into the device through the pipe 43 and the downward action of the valve 42 permits the fluid to pass through the opening 44 and exert pressure on the lower side of the piston 50 which is normally opposed by the action of the spring 51. This raises the rods 29 and 30 and the stop members 35 and 36 from engagement with members 27 and 28. In the positions shown in Fig. 4 the supercharging pressure is higher than is necessary for maintaining the amount of fuel supplied to the engine by the fuel pumps.

If the supercharging pressure decreases, the diaphragm 38 rises under the action of the spring 40. This causes the valve 42 to close the opening 44 and to permit the fluid to flow out of the chamber, thereby causing the spring 51 to force the piston 50 downwardly and bring the stop 36 into engagement with member 28. This downward action rotates the regulating rods 20 and 21 in a clockwise direction and decreases the amount of fuel injected by the pumps.

The two regulating devices 15 and 16 function in precisely the same way and either or both may serve to decrease the supply of fuel to both rows of cylinders when the pressure of the supercharging air in either of the supercharging units falls below a predetermined pressure.

The rods 20 and 21 are operatively connected to a speed regulator 60. For convenience, the rod 61 is connected at one end to the lever 23 and at the other end to the casing 62 of the resilient coupling 63. The governor is intermediately connected to a rod 64, one end of which is connected to a servo-motor 65 and the other end acts against a spring 66 in the resilient coupling. As shown in Figs. 1 to 3, each of the shafts 70 and 71 has one of the gears 72 and 73 attached thereto which drive a common gear 74 coupled to the electric generator 75. The load on the electric generator is controlled by means of the variable field current apparatus 76. The rod 64 operates the valve 80 of the servo-motor 65 which causes the fluid medium therein to move the piston 81 upwardly or downwardly to vary the current in the field winding.

When the stop members 35 and 36 are in the positions shown, out of pressing engagement with the members 27 and 28, the governor 60 is free to shift the rods 61 and 64 in either direction, thereby increasing or decreasing the quantity of fuel injected by the pumps and also varying the resistance of the field-regulating apparatus 76. When either of the stop members 35 or 36 is in pressing engagement with either of the members 27 or 28, the governor is not able to increase the quantity of fuel beyond the value given by the stop 35 or 36. The governor in such a case would only act on the apparatus 76 thus reducing the load to a value corresponding to the reduced quantity of fuel. If the load of the engine would drop below the value corresponding to the actual position of the stops 35 or 36 the rod 64 again enters into rigid contact with the resilient coupling 63 so that the governor reduces the fuel. The two shafts 20 and 21 act in unison and as determined by the lowest supercharging pressure acting upon either of the two limiting devices.

The valve 80 of the servo-motor 65 is only in the shutoff position when the governor 60 is in the normal position corresponding to the desired speed. As soon as the speed changes, the valve moves out of the shutoff position as shown in Fig. 4 and increases or decreases the excitation in the field of the control apparatus 76. As soon as the excitation is changed to such an extent that the desired speed is restored, the valve 80 assumes the shutoff position stopping the piston 81.

Fig. 5 shows an engine with four supercharging units 90, 91, 92 and 93 which are similar to those just described. The supercharging air in the manifolds 94, 95, 96 and 97 are conveyed to the limiting devices 98, 99, 100 and 101, through the pipes 102, 103, 104 and 105 respectively. Each manifold supplies its own group of cylinders and there are two groups of cylinders in each row of cylinders. Each of the air manifolds supplies air to one distinct group of cylinders.

As shown in Fig. 6, the limiting device 100, shown in section, acts in a direct manner instead of by means of a servo-motor. Each limiting device is the same as device 100 and comprises a diaphragm 106 acted upon by the supercharging air pressure from pipe 104, and a spring 107 which opposes this action. The mode of action of these limiting devices is, in principle, the same as the devices illustrated in Fig. 4, with respect to the action upon the fuel pumps.

The limiting devices 98 and 99 accordingly act on the regulating rods 108 and 109 which are rigidly connected together, and the devices 100 and 101 act on the rods 110 and 111 which are also rigidly connected together. Each regulating rod is connected to and controls the action of the fuel pumps to one group of cylinders. These two-rod systems are connected independently with the governor 115 each through a resilient coupling 116 and 117. Accordingly, on a decrease of the supercharging pressure of one unit, only that rod system is withdrawn from the action of the governor 115, for example, rod system 108 and 109 or the rod system 110 and 111. The fuel pumps connected to the other rod system are then always operated with the amount of fuel set by the governor.

In the limiting device shown in Fig. 7, two separate diaphragms 120 and 121 act against the springs 122 and 123 and carry the lifters 124 and 125 downwardly. The lifters are arranged to engage a flange 126 on the rod 127 and to move the lever 128 against the action of spring 129. The diaphragms are acted upon by supercharging air from separate supercharging units through the pipes 130 and 131. The two diaphragm units act upon a single servo-motor comprising valve 132, fluid inlet 133, piston 134, spring 136, lever 128, rod 137, passage 138, and chamber 139. That diaphragm which is connected to the supercharging unit with lower supercharging pressure (in the example shown this is the diaphragm 121), compresses the spring 129 and then brings the right end of the lever 128 upwardly. The mode of working this device with respect to its action upon the fuel pumps is the same as the limiting devices shown in Fig. 4.

Fig. 8 shows a limiting device in which the supercharging pressures from two units are imposed on the diaphragm 140 by means of pipes 141 and 142. The position of parts is for a case where the pressure in the pipe 141 is greater than in pipe 142.

The air entering through the pipe 141 presses the diaphragm 140 with the valve 145 downwardly connecting space 146 to space 147. The air entering through the pipe 142 therefore reaches the upper side of the diaphragm 150 and presses this downwardly against the pressure of the spring 151. The lever 152 is pressed downwardly carrying the valve 153 with it and opening the passage 154 to fluid medium from pipe 155. The pressure medium in chamber 156 operates the piston 157 and stop member 36 in the manner previously described. If, on the contrary, the supercharging pressure in the pipe 142 predominates, then the air entering through the pipe 142 presses the diaphragm 140 upwardly. The valve 145 then connects the space 158 to the space 147 by means of the axial hole 159 in the valve 145 through the opening 160.

When the valve 145 passes from the lower to the upper end position for a certain time, the space 146 as well as the space 158 is connected to the space 147 so that therefore the limiting device is effective even if the supercharging pressure are approximately equal.

I claim:

1. The combination with a two-shaft internal combustion engine having one row of cylinders for each shaft, gears connecting the two shafts to a common shaft and each row being supplied with air by at least two supercharging units, each unit supplying air to a group of the cylinders of one row, fuel pump means for the cylinders of each group, a fuel-pump regulating-rod for the fuel pump means of each group of cylinders, a speed governor, resilient coupling means connecting the governor to the regulating rod of each group, a limiting device connected to and actuated by the air pressure of each unit, and means operatively connecting the regulating rod of each group to the limiting device of its respective group and means operatively interconnecting the regulating rod of one group of cylinders with the rod of the corresponding group of cylinders of the other row.

2. A device for limiting the fuel admitted to an internal combustion engine having two rows of cylinders, a separate supercharging air unit for each row of cylinders and a separate fuel pump for each cylinder which comprises a servo-motor, means actuated by the servo-motor for limiting the control of fuel pumps, a separate pressure responsive means connected to and operated by the supercharging air of each of the supercharging air units, said pressure responsive means being operatively connected to the servo-motor whereby changes in pressure of the supercharging air of either unit may cause the servo-motor to change the limiting effect on the fuel pumps.

3. The combination with a two-shaft internal combustion engine having one row of cylinders for each shaft, gears connecting the two shafts to a common shaft and at least one supercharging unit for supplying air to each row of cylinders, which comprises separate pump means for supplying fuel to each row of cylinders, regulating rod means for regulating the pump means for each row of cylinders, means operatively interconnecting the regulating rods of the rows of cylinders so that the regulating rods so connected move in unison, a limiting device supplied with and actuated by air from each of the supercharging units, means operatively connecting at least two limiting devices to one of the regulating rods, a speed governor driven by the engine, a resilient coupling interconnecting the governor and the regulating rod means permitting either limiting device of the rows of cylinders to decrease the supply of fuel independently of the governor and said governor to increase or decrease the supply of fuel but not to increase the supply of fuel in counteraction to said limiting devices.

4. The combination with a two-shaft internal combustion engine having one row of cylinders on each shaft, a common shaft driven by gears from the two shafts and a separate supercharging unit for supplying air to each row of cylinders which comprises pump means for supplying fuel to each row of cylinders, a regulating rod for regulating the pump means for each row of cylinders connected to one supercharging unit, means operatively interconnecting the regulating rods of the rows of cylinders so that they move in unison, a limiting device supplied with and actuated by air from each of the supercharging units, means operatively connecting each limiting device to the regulating rod of its supercharging unit, a speed governor for increasing and decreasing the fuel supply, a resilient coupling interconnecting the regulating rods and the speed governor, said limiting devices, resilient coupling, regulating rods and governor being constructed and arranged whereby either or both of the limiting devices may decrease the supply of fuel when the pressure of the supercharging air falls below a certain value irrespective of the action of the governor.

OSKAR SCHLAEPFER.